United States Patent
Frobose et al.

(10) Patent No.: US 10,092,958 B2
(45) Date of Patent: Oct. 9, 2018

(54) PROCESSING MACHINE AND METHOD FOR WORKING THE END OF A PIPE

(71) Applicant: SANDVIK MATERIALS TECHNOLOGY DEUTSCHLAND GMBH, Dusseldorf (DE)

(72) Inventors: Thomas Frobose, Versmold (DE); Udo Rauffmann, Werther (DE)

(73) Assignee: SANDVIK MATERIALS TECHNOLOGY DEUTSCHLAND GMBH, Düsseldorf (DE)

(*) Notice: Subject to any disclaimer, the term of this patent is extended or adjusted under 35 U.S.C. 154(b) by 0 days.

(21) Appl. No.: 14/651,331

(22) PCT Filed: Dec. 10, 2013

(86) PCT No.: PCT/EP2013/076106
§ 371 (c)(1),
(2) Date: Jun. 11, 2015

(87) PCT Pub. No.: WO2014/090813
PCT Pub. Date: Jun. 19, 2014

(65) Prior Publication Data
US 2015/0314374 A1 Nov. 5, 2015

(30) Foreign Application Priority Data

Dec. 12, 2012 (DE) .................. 10 2012 112 118
Feb. 15, 2013 (DE) .................. 10 2013 101 560

(51) Int. Cl.
*B23B 5/16* (2006.01)
*B23B 13/12* (2006.01)
(Continued)

(52) U.S. Cl.
CPC .............. *B23B 5/16* (2013.01); *B23B 13/121* (2013.01); *B23P 25/003* (2013.01);
(Continued)

(58) Field of Classification Search
CPC ....... Y10T 82/10; Y10T 82/2512; B23B 1/00; B23B 5/16; B23B 13/121; B23B 2250/12;
(Continued)

(56) References Cited

U.S. PATENT DOCUMENTS

| 4,311,789 A | 1/1982 | Nylen et al. |
| 4,739,640 A | 4/1988 | Hurst et al. |

(Continued)

FOREIGN PATENT DOCUMENTS

| CN | 1672867 B | 5/2012 |
| CN | 202700985 U | 1/2013 |

(Continued)

OTHER PUBLICATIONS

Keeney et al., "Cryogenic blast cleaning", Aise Steel Technology, Aise, Pittsburgh, PA, US, vol. 75, No. 1, Jan. 1, 1998, pp. 56-57, XP00732788.

(Continued)

*Primary Examiner* — Alan Snyder
(74) *Attorney, Agent, or Firm* — Morgan, Lewis & Bockius LLP

(57) ABSTRACT

A processing machine and method for planing an end surface of a finished pipe with a clamping device for the pipe to be processed via a tool holder with a planing tool, whereby the tool holder is driven by a motor and can rotate about an axis of rotation. The tool holder is driven by a motor so that it can rotate about an axis of rotation, whereby the clamping device and the tool holder are driven by a motor and can move toward one another in a direction parallel to the axis of rotation of the tool holder. The processing machine includes a cooling device that is arranged in such a manner that it cools the pipe to be (Continued)

processed and/or the planing tool with the aid of liquid and/or solid carbon dioxide during the operation of the device.

10 Claims, 3 Drawing Sheets

(51) Int. Cl.
  *B23P 25/00* (2006.01)
  *B23Q 11/10* (2006.01)
  *B23B 1/00* (2006.01)
(52) U.S. Cl.
  CPC ...... *B23Q 11/1053* (2013.01); *B23Q 11/1061* (2013.01); *B23B 1/00* (2013.01); *B23B 2250/12* (2013.01); *Y10T 82/10* (2015.01); *Y10T 82/2512* (2015.01)
(58) Field of Classification Search
  CPC  B23P 25/003; B23Q 11/1053; B23Q 11/1061
  See application file for complete search history.

(56) References Cited

U.S. PATENT DOCUMENTS

| | | | |
|---|---|---|---|
| 4,829,859 A * | 5/1989 | Yankoff | B23Q 11/1053 407/11 |
| 5,580,845 A | 12/1996 | Ruane | |
| 5,592,863 A | 1/1997 | Jaskowiak et al. | |
| 5,626,050 A | 5/1997 | Ploughe et al. | |
| 5,778,744 A | 7/1998 | Braun et al. | |
| 6,382,886 B1 * | 5/2002 | Jaeger | B23Q 11/0042 408/1 R |
| 7,513,121 B2 * | 4/2009 | Zurecki | B23P 25/003 239/128 |
| 2011/0232352 A1 | 9/2011 | Hayashi | |
| 2013/0209186 A1 | 8/2013 | Quintard et al. | |
| 2015/0321258 A1 * | 11/2015 | Frobose | B23B 5/16 82/47 |
| 2016/0193640 A1 | 7/2016 | Frobose et al. | |
| 2016/0279688 A1 | 9/2016 | Frobose et al. | |

FOREIGN PATENT DOCUMENTS

| | | |
|---|---|---|
| DE | 10 2008 003 494 A1 | 7/2009 |
| EP | 0 094 740 A1 | 11/1983 |
| EP | 0 098 492 A2 | 1/1984 |
| EP | 0 612 834 A1 | 8/1994 |
| EP | 0645208 A1 | 3/1995 |
| EP | 0945214 A2 | 9/1999 |
| EP | 1044762 A2 | 10/2000 |
| EP | 1208940 A2 | 5/2002 |
| EP | 1580284 A2 | 9/2005 |
| GB | 2106819 A | 4/1983 |
| GB | 2 199 519 A | 7/1988 |
| JP | S5992115 A | 5/1984 |
| JP | H05-116135 A | 5/1993 |
| JP | H06-134601 A | 5/1994 |
| JP | H09-19803 A | 1/1997 |
| JP | 2005-349554 A | 12/2005 |
| JP | 2008-093808 A | 4/2008 |
| WO | 2004/033154 A1 | 4/2004 |
| WO | 2012052650 A1 | 4/2012 |

OTHER PUBLICATIONS

Notification of the Second Office Action dated Jun. 2, 2017, for Chinese Patent Application No. 201480017004.9.
Communication pursuant to Article 94(3) EPC dated Apr. 13, 2017 issued in corresponding European Patent pplication No. 14709637.4.
Notification of the Second Office Action dated May 31, 2017, for Chinese Patent Application No. 201480017005.3.
Notice of Reasons for Rejection dated Sep. 26, 2017, for Japanese Patent Application No. 2015-546978.
Notification of the Third Office Action dated Nov. 3, 2017, for Chinese Patent Application No. 201380065107.8.
Office Action dated Jun. 11, 2018, issued in European Patent Application No. 13821076.0.

* cited by examiner

PROCESSING MACHINE AND METHOD FOR WORKING THE END OF A PIPE

RELATED APPLICATION DATA

This application is a § 371 National Stage Application of PCT International Application No. PCT/EP2013/076106 filed Dec. 10, 2013 claiming priority of DE Application Nos. 102012112188.5, filed Dec. 12, 2012 and 102013101560.3, filed Feb. 15, 2013.

The present invention relates to a processing machine and to a method for planing an end surface of a pipe.

In the manufacturing of pipes, especially by rolling or drawing, the finished pipes must be cut to length at some point in time. This cutting to length of pipes is generally designated as parting-off. When parting-off a pipe, it is divided into two pipe sections.

For many applications it is required that the end surfaces of each finished, cut-to-length pipe section have a high surface quality and planeness. Special requirements for the surface quality, in particular planeness, of the end surfaces of a pipe are set for such pipe sections that are to be connected to each other later by orbital welding.

It is therefore known that after the finished rolling or drawing, i.e. after the reduction of the inside and/or outside diameter(s) to the required nominal size, the pipes are parted-off outside of the rolling mill at first in a first machine, and then their end or ending surfaces are subsequently machined.

The known methods are found to be disadvantageous since they make the required surface quality of the end surfaces available only with great expense.

In contrast, the aim of the present invention is to provide a processing machine and a method which make it possible to machine the end surface of a finished pipe with improved quality.

This aim is achieved in accordance with the invention by a processing machine for planing an end surface of a pipe with a clamping device for the pipe to be processed, with a tool holder with a planing tool, whereby the tool holder is driven by a motor and can rotate about an axis of rotation, whereby the clamping device and the tool holder can be moved driven by a motor onto each other, in a direction parallel to the axis of rotation of the tool holder, and whereby the processing machine comprises a cooling device that is arranged in such a manner that it cools the pipe to be processed and/or the planing tool with the aid of liquid and/or solid carbon dioxide during the operation of the device.

It is surprising that the cooling of the engagement area between the tool and the workpiece, i.e., the pipe, with liquid or solid carbon dioxide ($CO_2$) also brings about a lubrication that results in an optimized surface quality of the end surface of the pipe processed in this manner. Therefore, in an embodiment, it is not necessary to supply an additional lubricant in addition to the $CO_2$.

In one embodiment the cooling device comprises at least one nozzle for the carbon dioxide, whereby the nozzle is arranged in such a manner that during the operation of the device the carbon dioxide flows out of the nozzle either onto the pipe or onto the planing tool, but preferably onto the pipe as well as onto the planing tool.

It is advantageous here if the nozzle is arranged in such a manner that the carbon dioxide flows out of the nozzle onto the pipe in the vicinity of the engagement between the pipe and the planing tool.

In order to make the liquid or solid nitrogen available, the cooling device advantageously additionally comprises a reservoir for liquid carbon dioxide that is connected via a line to the nozzle.

In order to discharge the carbon dioxide in a purposeful manner from the nozzle the cooling device comprises in one embodiment a device for producing compressed air that is also connected to the nozzle by a line.

If the cooling is to take place in one embodiment with solid carbon dioxide instead of liquid carbon dioxide it is advantageous if the nozzle is designed in such a manner that during the operation of the processing machine solid carbon dioxide in the form of dry ice snow is produced in the nozzle from the liquid carbon dioxide.

This type of cooling with solid carbon dioxide has the advantage that the spraying of the workpiece or of the tool with dry ice snow makes a more effective cooling available than having liquid nitrogen flow against it. An insulation due to gaseous carbon dioxide (Leidenfrost effect) between the pipe to be cooled and the liquid carbon dioxide is avoided.

In order to produce solid carbon dioxide or dry ice it is advantageous if the cooling device comprises at least one nozzle for the carbon dioxide, whereby the nozzle has an expansion chamber that is arranged in such a manner that liquid carbon dioxide can expand in the expansion chamber in such a manner that dry ice is produced.

In addition, in one embodiment, the cooling device comprises a device for producing compressed air that is connected via a line to the nozzle. Thereby is it purposeful if the end of the line is arranged in the nozzle in such a manner that the dry ice produced in the expansion chamber can be charged out of the nozzle with the aid of compressed air.

In another embodiment the processing machine has a stop for the end surface of the pipe to be processed. In this manner an exact positioning of the pipe introduced into the clamping device and of the end surface of this pipe can be made available. The stop for the end surface then preferably forms a reference for the advancing of the planing tool on the workpiece, i.e. the end surface of the pipe to be processed.

In an embodiment of the invention the stop can be moved driven by a motor in a direction substantially vertical to the axis of rotation of the tool holder from a first position into a second position, whereby the stop is arranged in the first position in such a manner that it can be brought into engagement with the end surface of the pipe to be processed, and the stop is arranged in the second position in such a manner that it frees the end surface of the pipe to be processed.

In this manner the end surface can be milled off with the planing tool without the stop preventing or limiting a removal of the end surface with the tool.

It is understood that the axis of rotation of the tool holder during operation of the machine preferably coincides with the axis of symmetry of the pipe to be processed. To this end in particular the clamping device is then arranged in such a manner that it clamps the pipe to be processed in such a manner that it's axis of symmetry coincides with the axis of rotation of the tool holder.

If directions parallel to or vertical to the axis of rotation are discussed in the present application, it is understood that this has the same meaning as directions vertical to or parallel to the axis of symmetry of the pipe to be processed. Furthermore, it is understood that if directions parallel to or vertical to the axis of rotation are discussed in the sense of the present application, deviations from the parallel direction or vertical direction are possible in the framework of the tolerances required for the machining of the pipe.

In order to be able to better understand the functionality of the processing machine of the invention as well as its optional features, the machine is explained in reference to the method of the invention which can be carried out with the processing machine.

The above mentioned problem is also solved by a method for planing an end surface of a pipe with the steps of clamping the pipe with a clamping device, rotating a planing tool about an axis of rotation coinciding with a symmetrical axis of the pipe to be processed, moving the pipe section and the planing tool relative to one another in a direction parallel to the axis of rotation toward each other, engaging the planing tool with an end surface of the pipe and planing the end surface of the pipe, characterized in that during the engagement between the planing tool and the end surface of the pipe, the pipe to be processed and/or the planing tool are cooled with liquid and/or solid carbon dioxide.

In one embodiment the clamping device can be moved driven by a motor in a direction parallel to the axis of rotation so that a relative advancing movement of the pipe to be processed and of the planing tool can be made in the axial direction, i.e. parallel to the axis of rotation of the tool holder without the tool holder itself having to make an advance in the axial direction.

Additionally or alternatively to a motor drive of the clamping device in a direction parallel to the axis of rotation, the tool holder with the planing tool can also comprise a drive for a linear movement in a direction parallel to the axis of rotation.

Thus in accordance with the present application, if an expression "advancing of the planing tool in a direction parallel to the axis of rotation toward the end surface of the pipe" is used then this advance can be brought about either by a motor drive of the tool holder parallel to the axis of rotation or by moving the pipe to be processed parallel to the axis of rotation.

In order to plane the end surface of the pipe the planing tool is rotated about the axis of rotation and is at the same time advanced in a direction parallel to the axis of rotation toward the end surface of the pipe. The planing tool comes into engagement with the end surface and the end surface of the pipe is planed.

In addition to the planing of the end surface the planing tool received on the tool holder can serve to chamfer the end surface.

In one embodiment of the invention the planing tool is a cutting plate or a cutting insert, preferably an indexable cutting plate for the machining with a defined cutting edge.

To this end, in one embodiment, the planing tool comprises an upper and a lower surface and side surfaces extending between the upper and the lower surfaces. The lower surface serves as a contact surface and engages in the mounted state with a corresponding surface of the tool holder. Two opposite edges between a side surface and the upper surface form the cutting edges of such a cutting tool. The tool is received on the tool holder in such a manner that, during the engagement of the planing tool with the workpiece, the upper surface forms the machining surface of the tool. In one embodiment the upper surface or the machining surface is concavely curved.

In one embodiment of the invention the processing machine additionally comprises a control, whereby the control is arranged in such a manner that it controls the operation of the processing machine in such a manner that it carries out the following steps: Rotating the tool holder about the axis of rotation, producing a relative motion between the tool holder and the clamping device in a direction parallel to the axis of rotation for the planing of an end surface of the pipe. In summary, the control is therefore arranged in such a manner that it controls the processing machine during operation in such a manner that it carries out the method in accordance with the invention.

In a variant the processing machine for planing an end surface of a pipe comprises a first clamping device for the pipe to be processed, a second clamping device for the pipe to be processed, a first tool holder with a parting-off tool and a second tool holder with a planing tool, whereby the first and the second tool holders driven by a motor can rotate about an axis of rotation, whereby at least the first or the second clamping device can be moved driven by a motor in a direction parallel to the axis of rotation of the first and the second tool holder, whereby the first and the second tool holder can be advanced driven by a motor in a direction vertical to the axis of rotation, and whereby the first and the second tool holder are arranged in such a manner that the tools received in the tool holders between the first and the second clamping device can be brought into engagement with the pipe to be processed.

A processing machine designed in such a manner makes it possible to not only plane the end surface of a pipe but also to parting-off the pipe with the same machine, whereby this machine can be integrated in one embodiment into a rolling mill or a drawing mill.

In order to be able to better understand the functionality of such a design of the invention it is explained using an embodiment of the method of the invention that can be carried out with the processing machine. The method comprises the additional steps: Clamping in a first pipe section of a pipe with a first clamping device, clamping in a second pipe section of the pipe with a second clamping device, rotating a parting-off tool about an axis of rotation coinciding with an axis of symmetry of the pipe to be processed, advancing the parting-off tool between the first and the second clamping device in a direction vertical to the axis of symmetry toward the pipe, bringing the parting-off tool into engagement with the pipe and parting-off the pipe so that a first and a second pipe section are formed, moving the first and the second pipe section of the parted-off pipe apart from one another, rotating the planing tool about the axis of rotation, moving the first pipe section and the planing tool relative to one another in a direction parallel to the axis of rotation toward one another, bringing the planing tool into engagement with an end surface of the first pipe section and planing the end surface of the first pipe section, moving the second pipe section and the planing tool relative to one another in a direction parallel to the axis of rotation toward one another, and bringing the planing tool into engagement with an end surface of the second pipe section and planing the end surface of the second pipe section.

It is immaterial for the present invention whether a planing of the end surface of the first pipe section or a planing of the end surface of the second pipe section takes place at first or even both end surfaces of the first and of the second pipe section are planed at the same time.

During the operation of the processing machine the parting-off tool received on the first tool holder is rotated about the axis of rotation and at the same time advanced toward the pipe to be parted-off in a direction vertical to the axis of rotation, i.e. in the radial direction. At this time the parting-off tool engages with the pipe and the pipe is parted-off, i.e., circumferentially separated. The separation of the pipe produces two pipe sections that are independent of one another and of which a first one is clamped in the first clamping device and a second one is clamped in the second clamping device.

After the parting-off, the two pipe sections are drawn apart from one another by changing the distance between the two clamping devices so that sufficient space is created between their end surfaces for introducing the planing tool.

In order to plane the end surfaces of the two pipe sections, the planing tool is rotated about the axis of rotation and at the same time advanced in a direction parallel to the axis of rotation toward the end surface selectively either of the first or of the second pipe section or, however, at the same time to the end surfaces of the first and of the second pipe section. Thereby the planing tool comes into engagement with the end surfaces and the end surfaces of the pipe sections are planed.

A parting-off tool in the sense of the present invention is, for example, a cutting plate or a cutting insert for the machining with a defined cutting edge. In particular, a turning tool is suitable as a parting-off tool.

In particular, the above-described planing tool with two cutting edges makes it possible to process the opposing end surfaces of the two pipe sections of the parted-off pipe with one and the same planing tool received in the second tool holder.

Other advantages, features and possibilities of application for the present invention become clear from the following description of an embodiment and from the associated figures.

In the figures identical reference numerals designate identical elements.

Figure 1:
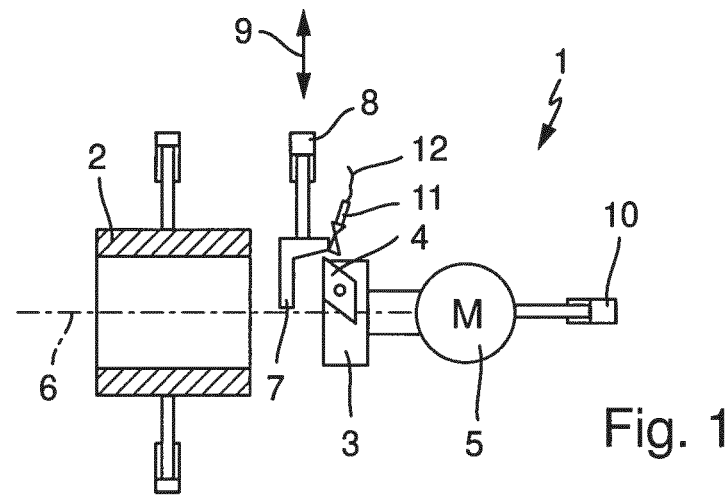
FIG. 1 shows a schematic lateral sectional view of an embodiment of the processing machine in accordance with the invention without a pipe taken up in it.
Figure 2:
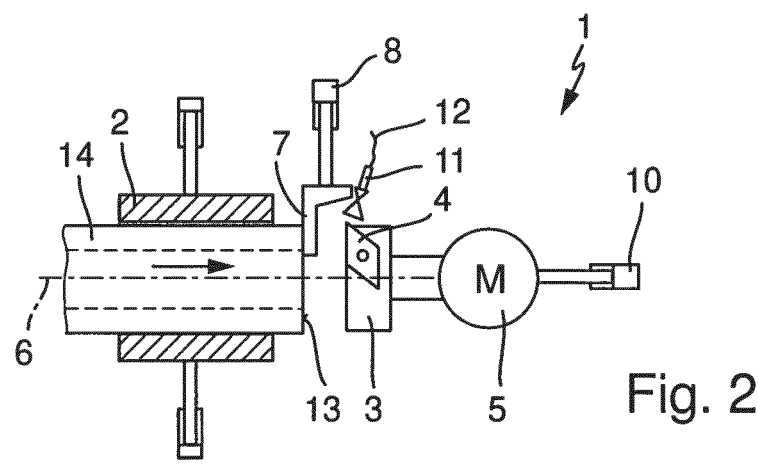
FIG. 2 shows a schematic sectional view of the processing machine of FIG. 1 with a pipe taken up in it.

FIG. 1 shows an embodiment of the processing machine 1 in accordance with the invention in a schematic lateral sectional view. The individual components of the machine 1 can be clearly recognized. The processing machine comprises a clamping cylinder 2 as clamping device for the pipe to be processed (not shown in FIG. 1). The clamping cylinder 2 grips the pipe on its outside circumference and exerts a force substantially in the radial direction of the pipe. Furthermore, the machine is provided with a tool holder 3 in which a planing tool 4 is received. The tool holder 3 is driven with the aid of a motor drive 5 in a rotatable manner about an axis of rotation 6 so that the planing tool 4 executes a rotary motion about the axis of rotation 6, whereby the radius on which the planing tool 4 moves corresponds approximately to the radius of the pipe to be processed and taken up in the clamping cylinder 2.

The machine is arranged in such a manner that the pipe to be processed and taken up in the clamping cylinder 2 is arranged in such a manner that its axis of symmetry substantially coincides with the axis of rotation 6 of the tool holder 3.

In order that a work plane of the machine is clearly defined, the machine furthermore comprises a stop 7 that is driven by a motor, in this case by a linear drive 8 in a direction 9 substantially vertical to the axis of rotation 6 and that can be moved out of the advance track of the tool holder 3.

Furthermore, the tool holder 3 can be moved by a linear drive 10 in a direction substantially parallel to the axis of rotation 6 so that the planing tool 4 can be advanced to the pipe to be processed and moved back again.

The nozzle 11 provided on the machine as component of a cooling device for cooling the work piece to be processed, i.e. the pipe, during the engagement between the planing tool 4 and the pipe 14 is decisive for the improvement in accordance with the invention of such a processing machine for planing an end surface of a pipe.

To this end the nozzle 11 is also connected to a device for producing compressed air via lines 12 and to a reservoir for liquid carbon dioxide. The nozzle 11 is arranged in such a manner that the liquid carbon dioxide from the reservoir can expand in an expansion chamber of the nozzle 11 and in this manner dry ice particles, also designated here as dry ice snow, are produced. This dry ice snow subsequently passes into the air current produced by the compressed air and is beamed at a high speed onto the surfaces to be cooled of the pipe to be processed and of the planing tool 4. Due to its solid aggregate state the dry ice snow does not form an insulating gaseous layer between the snow and the surfaces to be cooled, so that an effective cooling of the surfaces is brought about.

FIGS. 2 to 6 show the device during the turning and planing of the end surface 13 of an already parted-off, i.e. cut-to-length pipe 14. The pipe is moved in FIG. 2 into the clamping cylinder 2 of the processing machine 1 and comes to rest on stop 7. At this point in time of the machining procedure the stop 7 is moved radially with the aid of its motor drive 8 into the machine 1 so far that it extends at least sectionally along the end surface 13 of the pipe 14.

Figure 3:
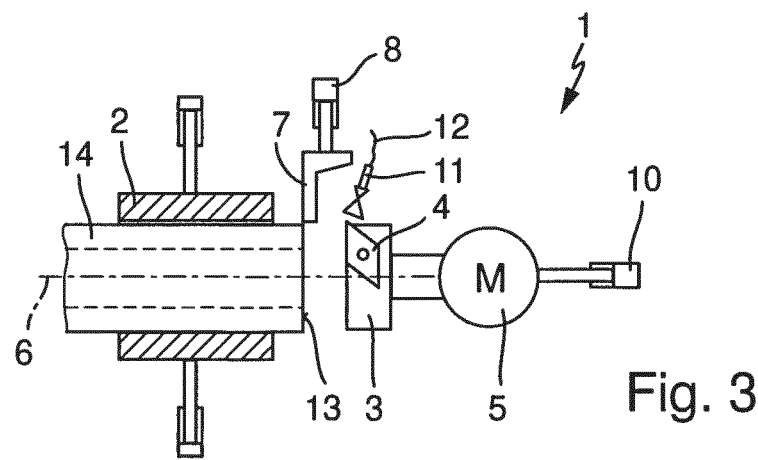
FIG. 3 shows a schematic sectional view of the processing machine of FIGS. 1 and 2 with extended stop.
Figure 4:
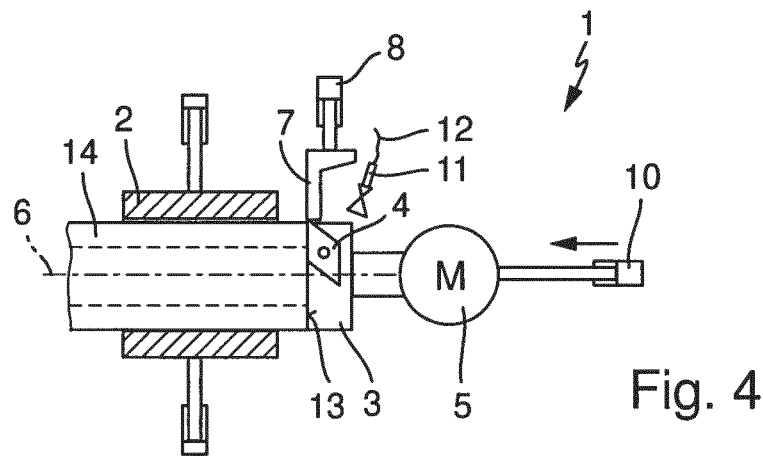
FIG. 4 shows a schematic sectional view of the processing machine of FIGS. 1 to 3 with the planing tool engaged with the pipe.
Figure 5:
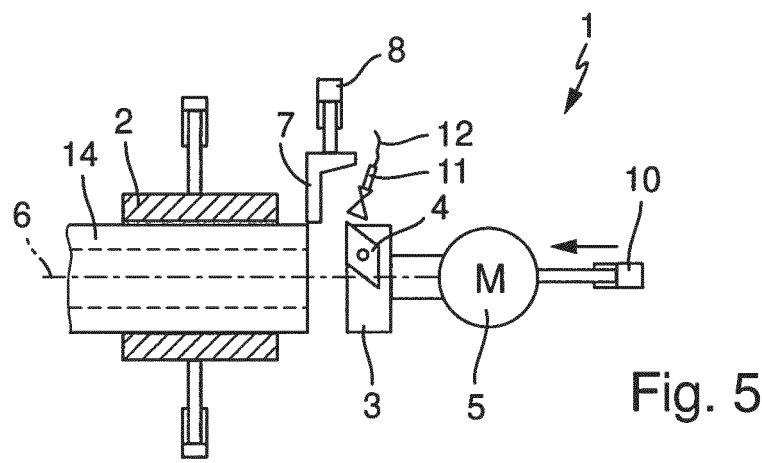
FIG. 5 shows a schematic sectional view of the processing machine of FIGS. 1 to 4 with retracted tool.

In the next step the clamping cylinder 2 is advanced so that the pipe 14 is clamped in the clamping cylinder 2 for the machining procedure. FIG. 3 now shows how the stop 7 is subsequently moved by the motor drive 8 out of the range of the end surface 13 of the pipe 14. The actual procedure of the planing or planing milling of the end surface 13 of the pipe 14 now begins, as is schematically shown in FIG. 4. To this end is the tool holder or more precisely the planing tool 4 received on it driven by the motor 5 so that it is rotated about the axis of rotation 6 and at the same time is advanced with the aid of the linear drive 10 in the direction towards the end surface 13 of the pipe 14 so that the planing tool 4 mills off the end surface 13 in the circumferential direction of the pipe 14.

At the same time dry ice snow is blown via the nozzle 11 into the area of the engagement between tool 4 and workpiece 14.

Figure 6:
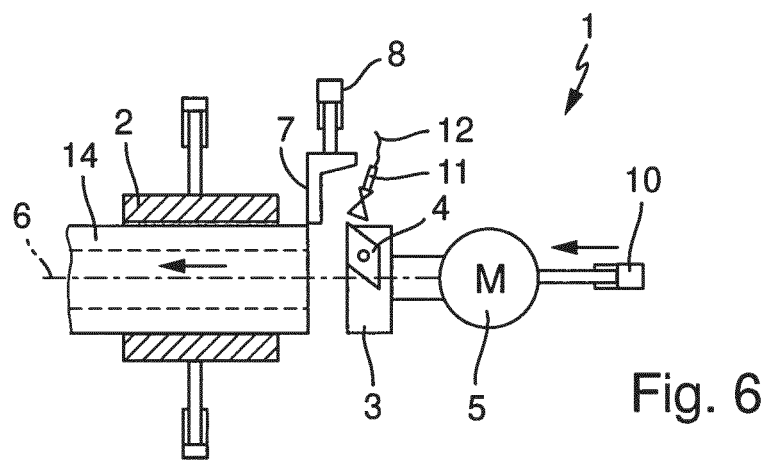
FIG. 6 shows a schematic sectional view of the processing machine of FIGS. 1 to 4 with extension of the processed pipe.

When the actual milling of the end surface 13 is ended, the tool 4 is retracted with the tool holder 3 as shown in FIG. 15 and the finished milled and planed pipe 14 is subsequently moved out as is indicated in FIG. 6 after the opening of the clamping cylinder 2.

Figure 7:
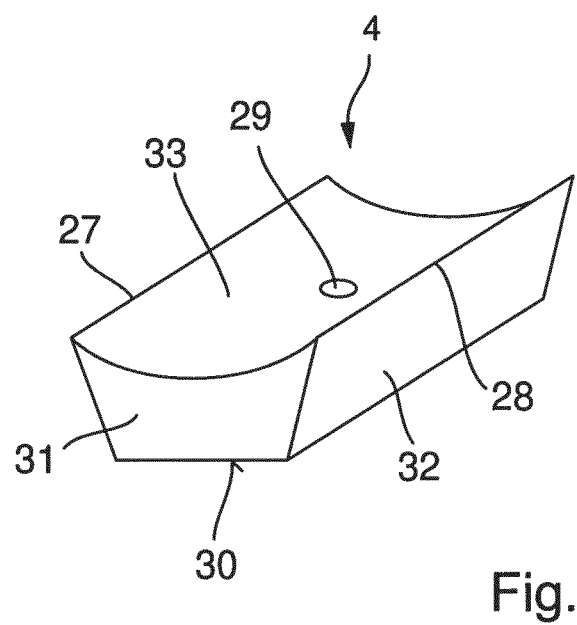
FIG. 7 shows a perspective view of an embodiment of the planing tool.

FIG. 7 shows an embodiment of the planing tool 4 received in the tool holder 3. The planing tool 4 is an indexable cutting insert with two cutting edges 27, 28. This indexable cutting insert can be used for the machining of the pipe ends of two pipe sections. During operation the cutting insert 4 is received in such a manner on the tool holder that the first cutting edge 27 can process the pipe end of a previously parted-off pipe section. In order to receive the cutting insert 4 on the tool holder 3 the tool 4 comprises a central fastening hole 29. Furthermore, the cutting insert 4 comprises a lower surface or bottom surface 30 that serves as a contact surface on the tool holder 3 and comprises side surfaces 31, 32 that connect the lower surface 30 to an upper surface 33. The upper surface 33 is designed concavely in the embodiment shown. The cutting insert 4 can be received on the tool holder 3 in such a manner that during the machining of the pipe ends the upper surface 33 serves as a chip surface on which the chips run off.

It is pointed out for purposes of the original disclosure that all features that result for a person skilled in the art from the present specification, the drawings and the claims, even if they were described concretely only in conjunction with certain other features, can be combined individually as well as in any combinations with other features or groups of features disclosed here in as far as this was not expressly excluded or unless technical facts render such combinations impossible or meaningless. For the sake of brevity and the legibility of the specification the comprehensive, explicit presentation of all conceivable combinations of features is not given here.

Whereas the invention was presented and described in detail in the drawings and the preceding specification, this presentation and specification are only by way of example and are not intended to be a limitation of the protective scope as it is defined by the claims. The invention is not limited to the disclosed embodiments.

Modifications of the disclosed embodiments are obvious to the person skilled in the art from the drawings, the specification and the attached claims. In the claims the word "comprise" does not exclude other elements or steps and the indefinite article "a" does not exclude a plurality. The mere fact that certain features are claimed in different claims does not exclude their combination. Reference numerals in the claims are not intended to be a limitation of the protective scope.

LIST OF REFERENCE NUMERALS

1 processing machine, machine
2 clamping cylinder
3 tool holder
4 planing tool
5 drive
6 axis of rotation
7 stop
8, 10 linear drive
9 direction
11 nozzle
12 line
13 end surface of pipe 14
14 pipe
27, 28 cutting edge
29 fastening hole
30 bottom surface
31, 32 side surface
33 chip surface

The invention claimed is:

1. A processing machine for planing an end surface of a pipe comprising:
   a clamping device for the pipe to be processed;
   a tool holder with a planing tool, whereby the tool holder is driven by a motor and can rotate about an axis of rotation, and whereby the clamping device and the tool holder can be moved onto each other, driven by a motor, in a direction parallel to the axis of rotation of the tool holder; and
   a cooling device that is arranged in such a manner that it cools the pipe to be processed and/or the planing tool with the aid of a cooling medium consisting essentially of solid carbon dioxide dry ice snow during the operation of the device and without formation of an insulating gaseous layer,
   wherein the cooling device includes at least one nozzle and a reservoir for liquid carbon dioxide that is connected via a line to the nozzle,
   wherein the nozzle has an expansion chamber that is arranged in such a manner that liquid carbon dioxide supplied from the reservoir expands in the expansion chamber to produce the solid carbon dioxide dry ice snow, and
   wherein the nozzle is arranged in such a manner that during the operation of the device the solid carbon dioxide dry ice snow flows out of the nozzle in the vicinity of engagement between the pipe and the planing tool.

2. The processing machine according to claim 1, wherein the nozzle is arranged in such a manner that during the operation of the device the solid carbon dioxide dry ice snow flows out of the nozzle onto the pipe in the vicinity of the engagement between the pipe and the planing tool.

3. The processing machine according to claim 1, wherein the nozzle is arranged in such a manner that during the operation of the device the solid carbon dioxide dry ice snow flows out of the nozzle onto the planing tool in the vicinity of the engagement between the pipe and the planing tool.

4. The processing machine according to claim 1, wherein an end of the line is arranged in the nozzle in such a manner that the solid dry ice snow produced in the expansion chamber can be charged out of the nozzle with the aid of compressed air.

5. The processing machine according to claim 1, further comprising a stop for an end surface of the pipe to be processed.

6. The processing machine according to claim 5, wherein the stop is driven by a motor in a direction substantially vertical to the axis of rotation of the tool holder from a first position into a second position, the stop being arranged in the first position in such a manner that it is brought into engagement with the end surface of the pipe to be processed, and the stop being arranged in the second position in such a manner that it frees the end surface of the pipe to be processed.

7. The processing machine according to claim 1, further comprising a first clamping device for the pipe to be processed, a second clamping device for the pipe to be processed, a first tool holder with a parting-off tool and a second tool holder with a planing tool, whereby the first and the second tool holders are driven by a motor so that they can rotate about an axis of rotation, whereby at least the first or the second clamping device is driven by a motor in a direction parallel to the axis of rotation of the first and the second tool holder, whereby the first and the second tool holder are advanced driven by a motor in a direction vertical to the axis of rotation, the first and the second tool holders being arranged in such a manner that the tools received in the tool holders between the first and the second clamping device can be brought into engagement with the pipe to be processed.

8. A method for planing an end surface of a pipe comprising the steps of:
   clamping the pipe with a clamping device;
   rotating a planing tool about an axis of rotation coinciding with a symmetrical axis of the pipe to be processed;
   moving the pipe section and the planing tool relative to one another in a direction parallel to the axis of rotation toward one another;
   engaging the planing tool with an end surface of the pipe;
   planing the end surface of the pipe; and
   producing solid carbon dioxide dry ice snow by expansion of liquid carbon dioxide in an expansion chamber,
   wherein during the engagement between the planing tool and the end surface of the pipe, the pipe to be processed and/or the planing tool are cooled with a cooling medium consisting essentially of the solid carbon dioxide dry ice snow and without formation of an insulating gaseous layer.

9. The method according to claim 8, wherein the solid carbon dioxide dry ice snow produced by the expansion of liquid carbon dioxide in the expansion chamber is charged out of the nozzle with the aid of compressed air.

10. The method according to claim 8, wherein the process occurs without the supply of an additional lubricant to the planing step.

* * * * *